US 9,736,023 B2

(12) United States Patent
Kim et al.

(10) Patent No.: US 9,736,023 B2
(45) Date of Patent: Aug. 15, 2017

(54) APPARATUS AND METHOD FOR CHANGING STATUS OF CLUSTER NODES, AND RECORDING MEDIUM HAVING THE PROGRAM RECORDED THEREIN

(71) Applicant: SAMSUNG SDS CO., LTD., Seoul (KR)

(72) Inventors: Jong Sam Kim, Hwaseong-si (KR); Ho Young Son, Suwon-si (KR); Hyun Soo Kim, Seoul (KR); Tack Su An, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 211 days.

(21) Appl. No.: 14/527,890

(22) Filed: Oct. 30, 2014

(65) Prior Publication Data

US 2015/0117258 A1    Apr. 30, 2015

(30) Foreign Application Priority Data

Oct. 30, 2013    (KR) .................. 10-2013-0130277

(51) Int. Cl.
*H04L 1/00* (2006.01)
*H04L 12/24* (2006.01)
*H04W 84/20* (2009.01)

(52) U.S. Cl.
CPC ...... *H04L 41/0833* (2013.01); *H04L 41/0816* (2013.01); *H04L 41/0886* (2013.01); *H04W 84/20* (2013.01)

(58) Field of Classification Search
None
See application file for complete search history.

(56) References Cited

U.S. PATENT DOCUMENTS

| | | | | |
|---|---|---|---|---|
| 5,699,500 A | * | 12/1997 | Dasgupta | G06F 9/52 714/1 |
| 6,356,985 B1 | * | 3/2002 | Ichimi | G06F 11/203 711/154 |
| 6,856,591 B1 | * | 2/2005 | Ma | H04L 41/0631 370/216 |
| 7,490,089 B1 | * | 2/2009 | Georgiev | G06F 11/203 |
| 7,925,922 B2 | * | 4/2011 | Baba | G06F 11/2028 714/11 |
| 9,015,518 B1 | * | 4/2015 | Wenzel | G06F 11/1479 714/4.1 |
| 2005/0066017 A1 | * | 3/2005 | Bogia | G06F 11/2046 709/220 |
| 2005/0138517 A1 | * | 6/2005 | Monitzer | G06F 11/2041 714/746 |
| 2005/0289390 A1 | * | 12/2005 | Baba | G06F 11/2028 714/11 |
| 2006/0224728 A1 | * | 10/2006 | Baba | G06F 11/2025 709/224 |
| 2006/0242453 A1 | * | 10/2006 | Kumar | G06F 11/0793 714/4.1 |
| 2007/0220323 A1 | * | 9/2007 | Nagata | G06F 11/2025 714/13 |

(Continued)

*Primary Examiner* — Bob Phunkulh
(74) *Attorney, Agent, or Firm* — Sughrue Mion, PLLC

(57) ABSTRACT

Provided are an apparatus and a method for changing a status of cluster nodes, which determine whether to change statuses of respective cluster nodes themselves to an active status or a standby status without intervention by a manager through self-diagnosis and change the status of the nodes.

18 Claims, 7 Drawing Sheets

(56) References Cited

U.S. PATENT DOCUMENTS

| | | | |
|---|---|---|---|
| 2008/0263209 A1* | 10/2008 | Pisharody | H04L 29/12783 709/227 |
| 2013/0080559 A1* | 3/2013 | Rao | H04L 67/1097 709/208 |
| 2013/0145105 A1* | 6/2013 | Sawicki | G06F 3/0619 711/147 |
| 2013/0151653 A1* | 6/2013 | Sawicki | G06F 15/17331 709/216 |
| 2014/0096121 A1* | 4/2014 | Joshi | G06F 8/65 717/170 |

* cited by examiner

[fig. 1]
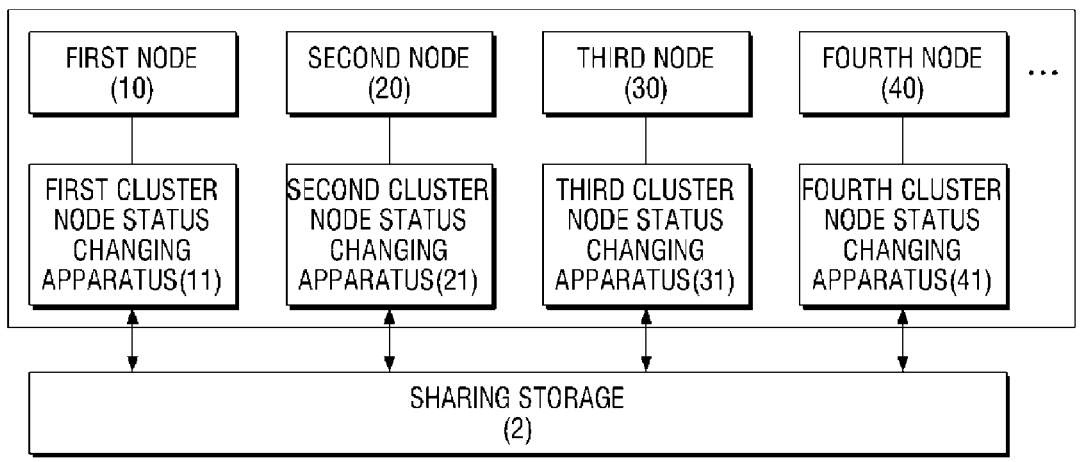
[fig. 2]
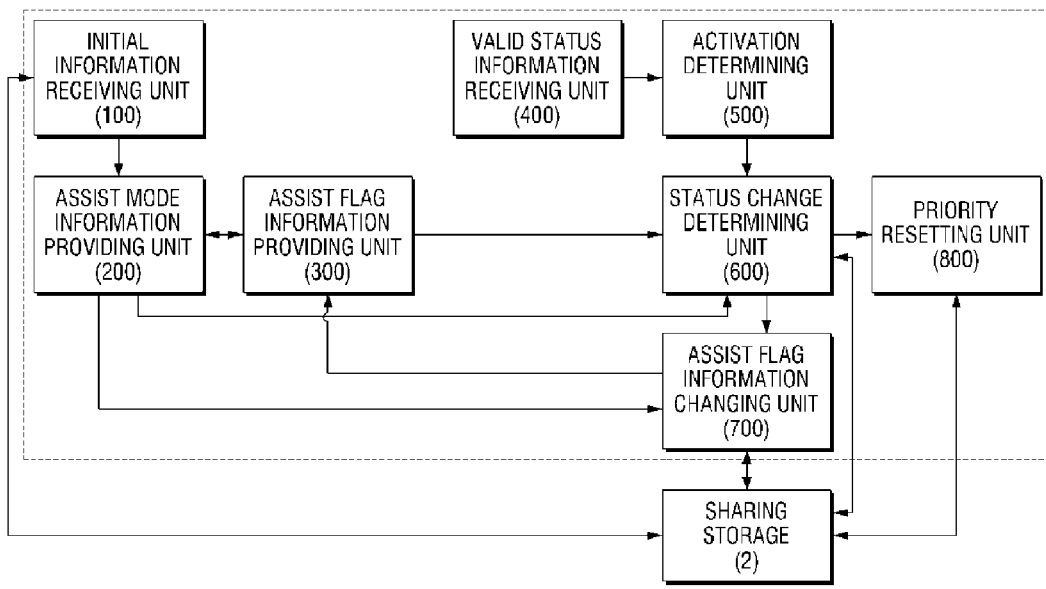

[fig. 3]
STATUS CHANGE DETERMINING UNIT (600)
[fig. 4]
STATUS CHANGE DETERMINING UNIT (600)
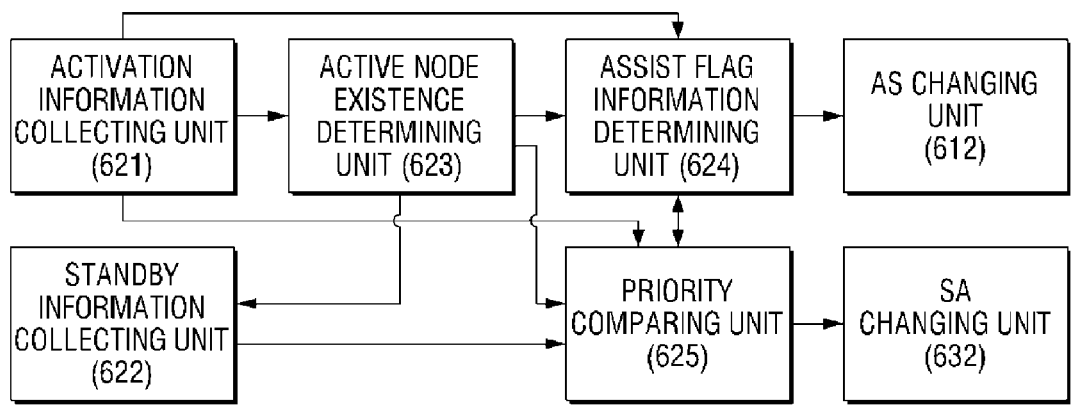

[fig. 5]
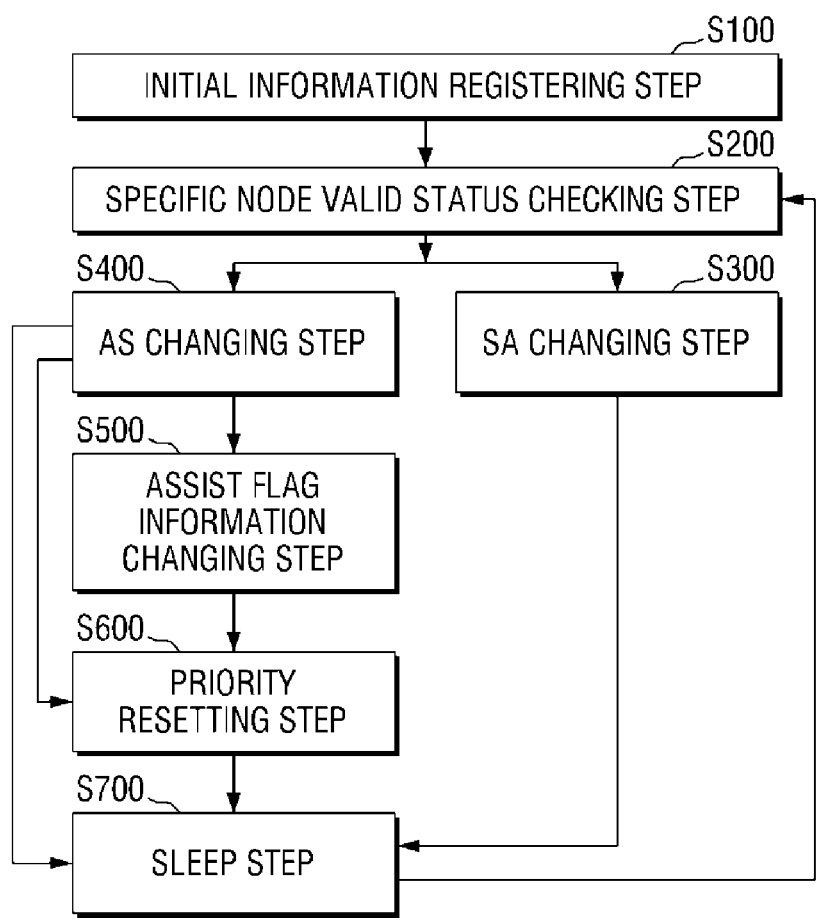

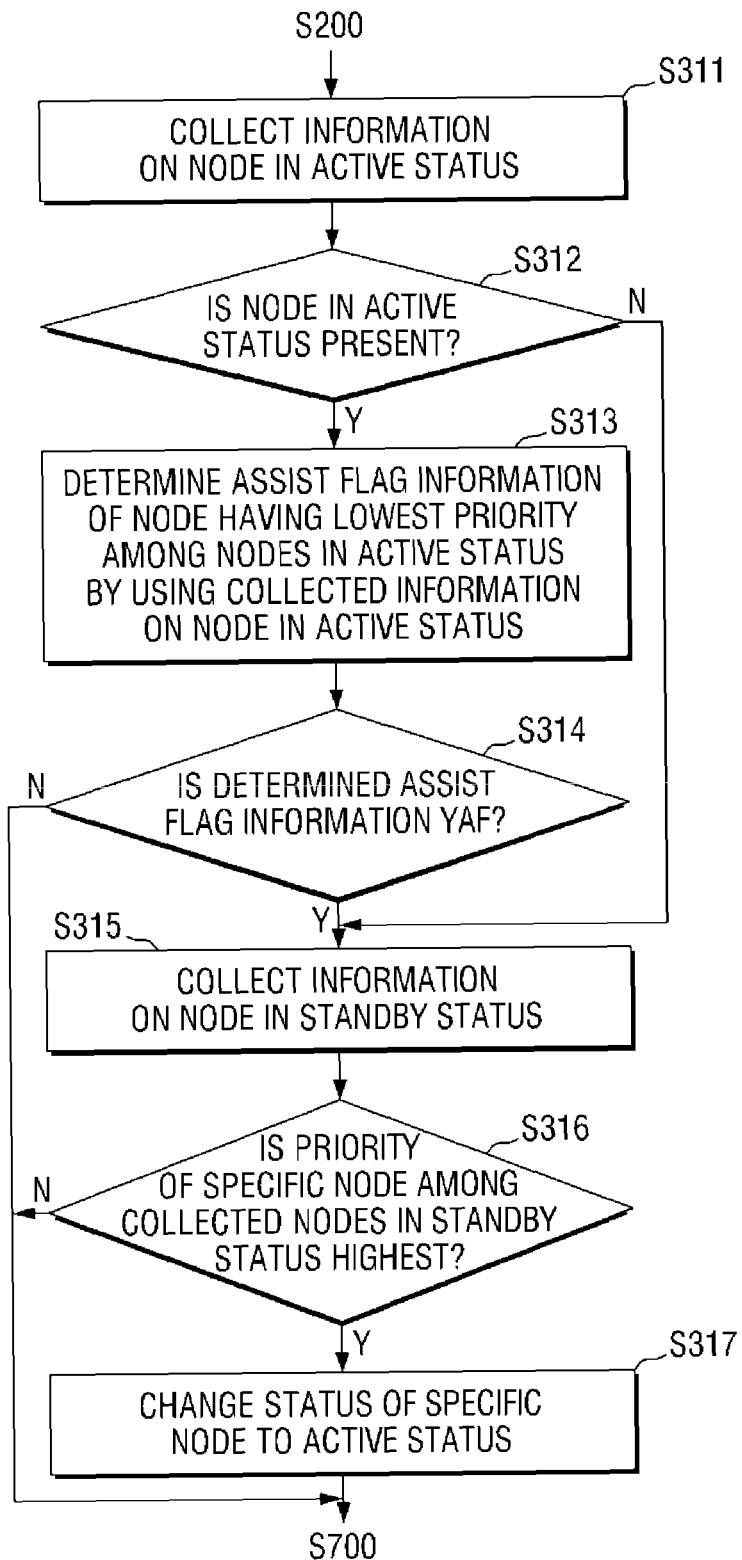
[fig. 6]

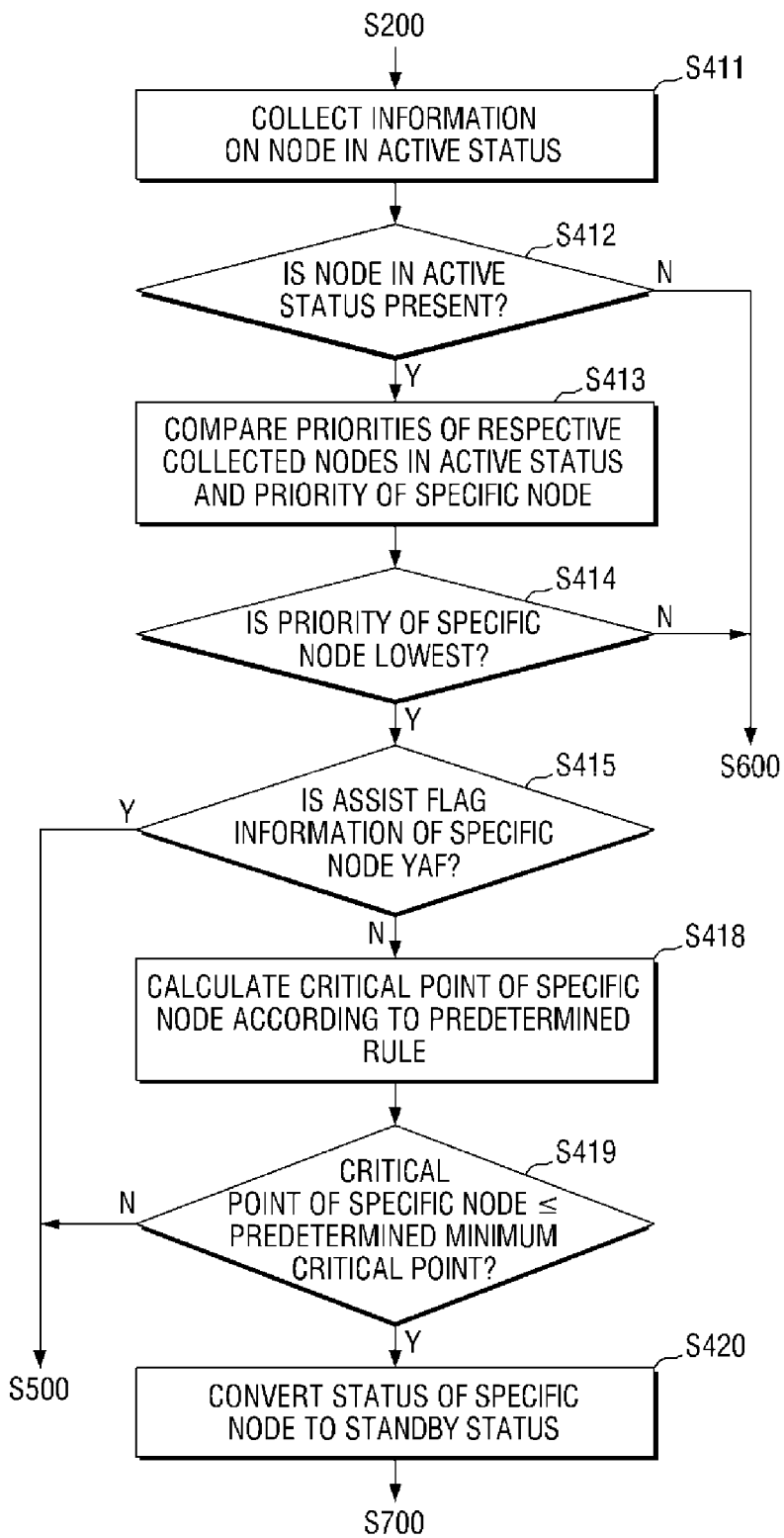

[fig. 8]
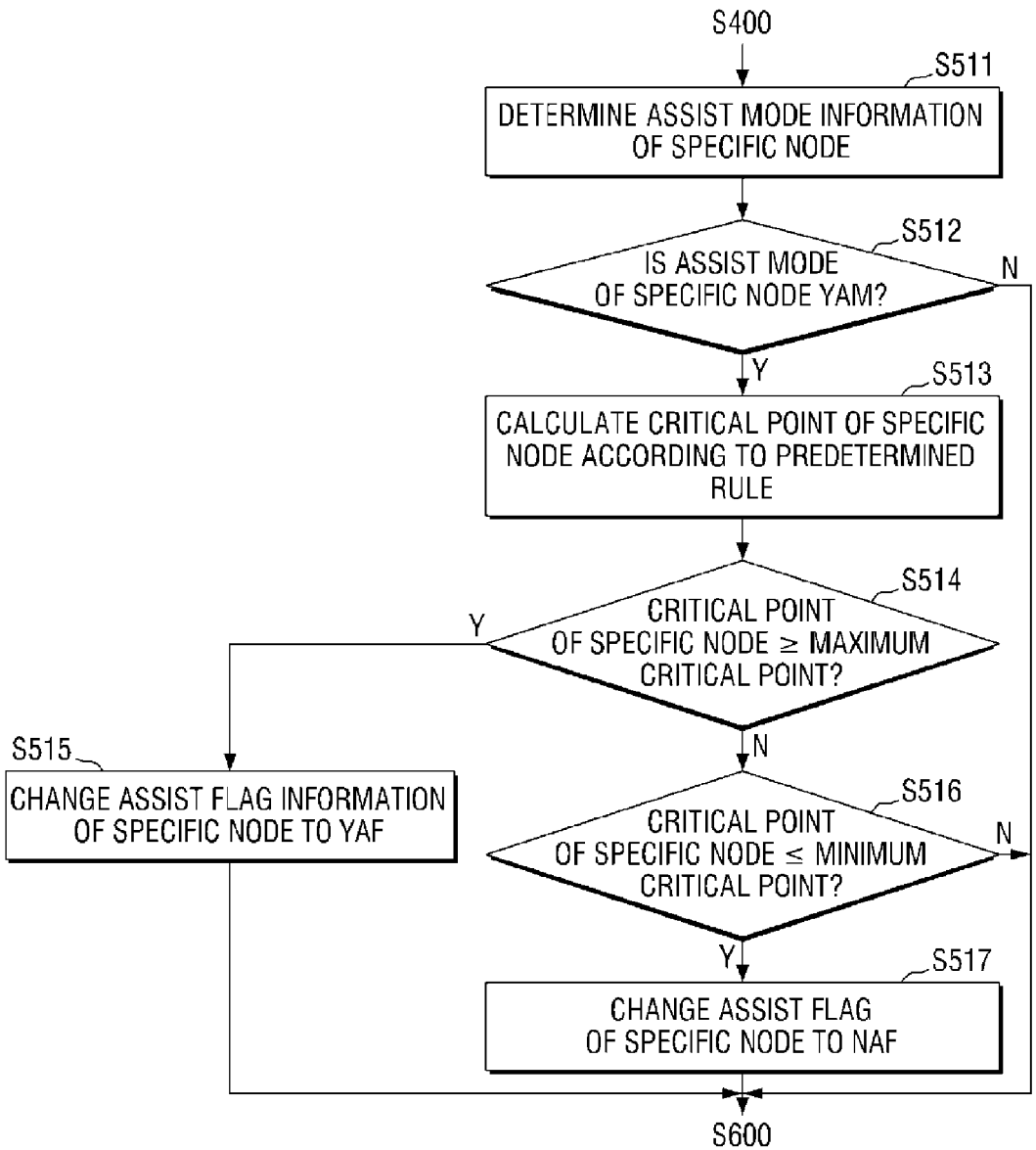

[fig. 9]
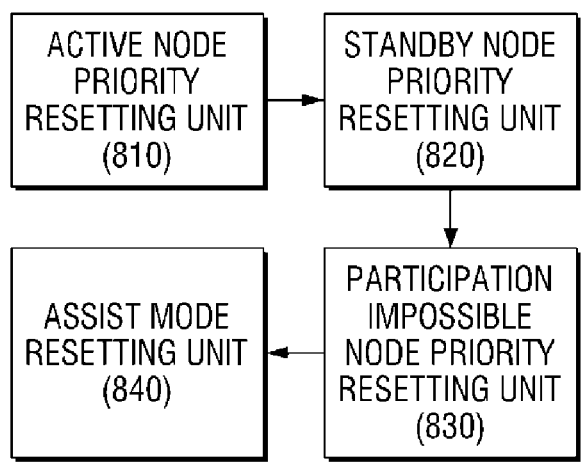
[fig. 10]
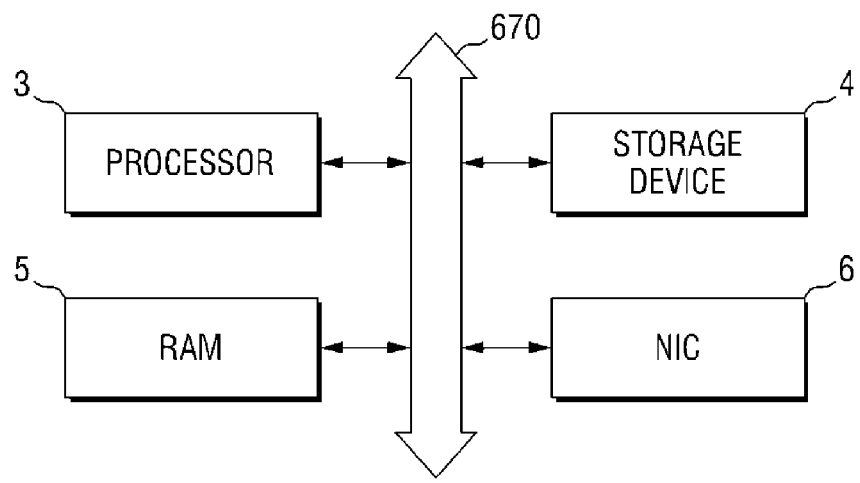

APPARATUS AND METHOD FOR CHANGING STATUS OF CLUSTER NODES, AND RECORDING MEDIUM HAVING THE PROGRAM RECORDED THEREIN

CROSS-REFERENCE TO RELATED APPLICATION

This application claims priority from Korean Patent Application No. 10-2013-0130277 filed on Oct. 30, 2013 in the Korean Intellectual Property Office, and all the benefits accruing therefrom under 35 U.S.C. 119, the contents of which in its entirety are herein incorporated by reference.

TECHNICAL FIELD

The present invention relates to an apparatus and a method for changing a status of cluster nodes, and a recording medium recording the program thereof. More particularly, the present invention relates to an apparatus and a method for changing a status of cluster nodes, which can change the cluster nodes without intervention by a manager, and a recording medium having a program recorded therein.

BACKGROUND

In the existing management of the cluster node, an active node that participates in a cluster and a standby node which does not participate in a current cluster, but stands by participation are designated and operated.

The active node that participates in the cluster may mean that only active nodes provide a service such as a resource, or the like to a user during operating the cluster.

In the related art, even upon extending the cluster, the active node and the standby node are designated and thereafter, added to extend the cluster.

Accordingly, in the existing management technique of the cluster node, by operating the cluster node without association with a surrounding environmental element, and an increase or a decrease of a service request of a user, resources are wasted or a reaction for satisfying appropriate service quality is not easy.

There is a method in which a manager manages the number of active nodes by continuously monitoring a continuous status of cluster nodes and a resource status, but the manager does not easily perform continuous monitoring and an immediate and an efficient reaction are not easy depending on the surrounding environment element, and the increase or the decrease of the service request by the user.

SUMMARY

The present invention has been made in an effort to provide an apparatus and a method for changing a status of cluster nodes, which determine whether to change statuses of respective cluster nodes themselves to an active status or a standby status without intervention by a manager through self-diagnosis and change the status of the nodes.

The technical objects of the present invention are not limited to the aforementioned technical objects, and other technical objects, which are not mentioned above, will be apparent to those skilled in the art from the following description.

An exemplary embodiment of the present invention provides an apparatus for changing a status of cluster nodes, which changes operation statuses of nodes included in a cluster under a multi node environment in which respective nodes have different priorities, including: an activation determining unit determining whether the specific node is in an active status or in a standby status in which the specific node stands by participating in the cluster when the information received by the valid status information receiving unit represents that the specific node is possible to participate in the cluster; and a status change determining unit determining whether to change the status of the specific node determined by the activation determining unit by using the different priorities of the respective nodes.

Another exemplary embodiment of the present invention provides a computer readable recording medium having a program recorded therein, in which the program performs the steps of: receiving information regarding whether a specific node among nodes included in a cluster under a multi-node environment in which respective nodes have different priorities is impossible to participate in the cluster; determining whether the specific node is in an active status or in a standby status in which the specific node stands by participating in the cluster when the information received by the valid status information receiving process represents that the specific node is possible to participate in the cluster; and determining whether to change the status of the specific node, which is determined by the activation determining unit.

Yet another exemplary embodiment of the present invention provides a method for changing a status of cluster nodes, which changes operation statuses of nodes included in a cluster under a multi node environment in which respective nodes have different priorities, including: receiving information regarding whether a specific node among the nodes is impossible to participate in the cluster; determining whether the specific node is in an active status or in a standby status in which the specific node stands by participating in the cluster when the information received by the receiving of the valid status information represents that the specific node is possible to participate in the cluster; and determining whether to change the status of the specific node determined by the activation determining unit by using the priorities of the respective nodes.

According to exemplary embodiments of the present invention, a cluster node can situationally change a status thereof to an active or standby status.

Since respective nodes can automatically appropriately change the status thereof according to various situations such as a user request, a load of a cluster, a resource providing situation, and the like without separate intervention by a manager, the present invention may be efficient in terms of cost.

Since the node can be efficiently and flexibly extended and reduced, easy management of the cluster node can be ensured and resource saving and desired quality of service (QoS) can be guaranteed.

BRIEF DESCRIPTION OF THE DRAWINGS

The above and other features and advantages of the present invention will become more apparent by describing in detail embodiments thereof with reference to the attached drawings in which:

FIG. 1 is a configuration diagram regarding a cluster to which an apparatus for changing a status of cluster management nodes is applied according to an exemplary embodiment of the present invention;

FIG. 2 is a block diagram regarding the apparatus for changing a status of a cluster according to the exemplary embodiment of the present invention;

FIG. 3 is a block diagram illustrating one example of a status change determining unit of the apparatus for changing a status of a cluster node according to the exemplary embodiment of the present invention;

FIG. 4 is a block diagram for describing detailed examples of an SA change determining unit and an AS change determining unit;

FIG. 5 is a flowchart regarding a method for changing a status of a cluster node according to an exemplary embodiment of the present invention;

FIG. 6 is a flowchart illustrating one example of an SA changing step (step S300) in which an SA change determining unit changes a status of a specific node which is a standby status to an active status;

FIG. 7 is a flowchart illustrating one example of an AS changing step (step S400) in which an AS change determining unit changes a status of a specific node which is an active status to a standby status;

FIG. 8 is a flowchart for describing one example of an assist flag information changing step (step S500);

FIG. 9 is a block diagram illustrating one example of a priority resetting unit; and FIG. 10 is a configuration diagram of the apparatus for changing a status of a cluster node according to an exemplary embodiment of the present invention.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a configuration diagram of a cluster to which an apparatus for changing a status of cluster nodes is applied according to an exemplary embodiment of the present invention.

Referring to FIG. 1, in the cluster to which the apparatus for changing a status of cluster nodes according to the exemplary embodiment of the present invention is applied, apparatuses for changing a status of cluster nodes may be present as many as one or more nodes that may provide a service such as a resource, or the like to a user and nodes clusters that are present in a cluster.

One apparatus for changing a status of cluster management nodes according to the exemplary embodiment of the present invention may be present in one node and may be present in the state where the apparatus is included in the node or connected with the node in a wired or wireless manner.

That is, a status of a first node 10 in the cluster may be self-diagnosed and changed by a first cluster node status changing apparatus 11, a status of a second node 20 may be self-diagnosed and changed by a second cluster node status changing apparatus 21, a status of a third node 30 may be self-diagnosed and changed by a third cluster node status changing apparatus 31, and a status of a fourth node 40 may be self-diagnosed and changed by a fourth cluster node status changing apparatus 41.

Nodes in the cluster described in the present invention have generally the same concept as nodes constituting the cluster, however, the respective nodes have priorities from a highest priority to a lowest priority. Further, the present invention may be efficiently applied to a cluster under a multi-node environment, but applied even to a cluster under a single-node environment.

The priorities of the respective nodes may vary situationally.

A sharing storage may store information shared by the cluster node status changing apparatuses that are present in the respective nodes in the cluster.

In detail, the sharing storage may store metadata of the respective nodes, information on a predetermined rule, information on a predetermined time, information on a predetermined maximum critical point, and/or information on a predetermined minimum critical point.

The cluster node status changing apparatus of each node may collect various pieces of information on statuses of other nodes as well as the node of the cluster node status changing apparatus, through the metadata of the respective nodes of the sharing storage.

In the present invention, a process of determining/changing whether each node is in an active or inactive status according to the priority may be performed.

An apparatus and a method for changing a status of cluster nodes according to an exemplary embodiment of the present invention will be described in detail with reference to FIGS. 2 to 9.

FIG. 2 is a block diagram of the apparatus for changing a status of cluster nodes according to an exemplary embodiment of the present invention.

Referring to FIG. 2, the apparatus 1000 for changing a status of cluster nodes according to the exemplary embodiment of the preset invention may include an initial information receiving unit 100, an assist mode information providing unit 200, an assist flag information providing unit 300, a valid status information receiving unit 400, an activation determining unit 500, a status change determining unit 600, an assist flag information changing unit 700, and a priority resetting unit 800.

The apparatus 1000 for changing a status of cluster nodes according to the exemplary embodiment of the preset invention will be described using an apparatus that is present in one specific node among nodes in a cluster 1 as an example.

For example, the apparatus 1000 for changing a status of cluster nodes according to the exemplary embodiment of the preset invention may be any one of the first cluster node status changing apparatus 11, the second cluster node status changing apparatus 21, the third cluster node status changing apparatus 31, and the fourth cluster node status changing apparatus 41 in FIG. 1.

For example, the specific node may also be any one of a first node, a second node, a third node, and a fourth node in FIG. 1.

Continuously referring to FIG. 2, the initial information receiving unit 100 may receive from the sharing storage 2 initial priority setting information of the specific node and information on the maximum number of nodes of which statuses are changeable to the active status which is a status which a node participates in the cluster 1 among all nodes that are present in the cluster 1.

The maximum number of nodes of which statuses are changeable to the active status stored in the sharing storage 2 may previously set by a manager, and the like. For example, in the case where 100 nodes are present in the cluster 1, when the manager intends to set at least 20 nodes among 100 nodes in a standby status, the manager may set 80 or less to the maximum number of nodes of which statuses are changeable to the active status.

The assist flag information providing unit 300 may provide assist flag information which is information regarding whether the standby status of a node corresponding to a lower priority by one step is changeable or unchangeable to the active status when a node corresponding to a lower priority than the priority of the specific node by one step is in the standby status.

In the following description, the information indicating that the standby status is changeable to the active status of the assist flag information provided by the assist flag information providing unit 300 will be referred to as 'Yaf information' and the information indicating that the standby status is unchangeable to the active status will be referred to as 'Naf'.

The assist mode information providing unit 200 may provide assist mode information which is information regarding whether assist flag information provided by the assist flag information providing unit 300 is changeable by using information on the maximum number of nodes of which the statuses are changeable to the active status received by the initial information receiving unit 100.

In the following description, a case in which the assist flag information of the assist mode information provided by the assist mode information providing unit 200 is changeable will be referred to as 'Yam' and a case in which the assist flag information is unchangeable will be referred to as 'Nam'.

The assist flag information and the assist mode information may be used for the status change determining unit 600 to change the status of the specific node.

The valid status information receiving unit 400 receives a predetermined signal from the specific node to receive information regarding whether the specific node is not able to participate in the cluster 1.

The predetermined signal is a signal which is promised in advance, in order to notify to the cluster node status changing apparatus 1000 according to the exemplary embodiment of the present invention that the specific node is not able to participate in the cluster 1 due to a problem such as a failure, or the like.

The predetermined signal is periodically or aperiodically transmitted to be received by the valid status information receiving unit 400. The predetermined signal may be updated to, for example, a current timestamp value and the valid status information receiving unit 400 may receive the updated signal.

A valid status which is not the status in which the node is not able to participate in the cluster, which is used as above may mean that the status of the node is the active status or the standby status.

The node in the active status means a node used while the cluster 1 provides the service such as providing a resource, or the like by a request by the user and the node in the standby node means a node which is not used in the current service providing process, but stands by being changed to the active status as compared with an increase in request by the user.

The activation determining unit 500 may determine whether the specific node is in the active status or the standby status when the information received by the valid status information receiving unit indicates the case in which the specific node is able to participate in the cluster 1.

For example, the activation determining unit 500 may determine whether the specific node is in the active status or the standby status by acquiring metadata information of the specific node from the sharing storage 2.

The status change determining unit 600 may determine whether to change the status of the specific node determined by the activation determining unit 500.

The priority resetting unit may reset priorities of the specific node and other nodes included in the cluster 1 except for the specific node when the specific node satisfies a predetermined case.

The assist flag information changing unit 700 may change the assist flag information of the specific node under a specific condition.

The status change determining unit will be described in detail with reference to FIG. 3.

FIG. 3 is a block diagram illustrating one example of a status change determining unit 600 of the apparatus 1000 for changing a status of a cluster node according to the exemplary embodiment of the present invention.

Referring to FIG. 3, the status change determining unit 600 may include an SA change determining unit 630 and an AS change determining unit 610.

When the specific node is in the standby status, the SA change determining unit 630 may determine whether to change the status of the specific node in the standby status to the active status.

When the specific node is in the active status, the AS change determining unit 610 may determine whether to change the status of the specific node in the active status to the standby status.

Referring to FIG. 4, the SA change determining unit 630 and the AS change determining unit 610 will be described in more detail.

FIG. 4 is a block diagram for describing detailed examples of an SA change determining unit and an AS change determining unit.

In FIG. 4, an activation information collecting unit 621, a standby information collecting unit 622, an active node existence determining unit 623, an assist flag information determining unit 624, and a priority comparing unit 625 may be present in each of the SA change determining unit 630 and the AS change determining unit 610 and perform the same function, and as a result, may be shared by the SA change determining unit 630 and the AS change determining unit 610.

That is, the SA change determining unit 630 may include an activation information collecting unit 621, a standby information collecting unit 622, an activation node existence determining unit 623, an assist flag information determining unit 624, a priority comparing unit 625, and an SA changing unit 632. The AS change determining unit 610 may include the activation information collecting unit 621, the standby information collecting unit 622, the activation node existence determining unit 623, the assist flag information determining unit 624, the priority comparing unit 625, and an AS changing unit 612.

Continuously referring to FIG. 4, the activation information collecting unit 621 may collect information on the node in the active status among the nodes included in the cluster 1 from the metadata of the sharing storage 2.

The standby information collecting unit 622 may collect information on the node in the standby status among the nodes included in the cluster 1 from the metadata of the sharing storage 2.

The information on the node in the active status, which is collected by the activation information collecting unit 621 may include priority information and assist flag information of the node in the active status and information on a node in an inactive status, which is collected by the standby information collecting unit may include priority information of the node in the standby status.

The active node existence determining unit 623 may determine whether the node in the active status is present based on the information collected by the activation information collecting unit 621.

The assist flag information determining unit 624 may determine the assist flag information of the node in the active status by using the information on the node in the active status, which is collected by the activation information collecting unit 621.

When the status of the specific node is the activate status, the priority comparing unit 625 may compare the priorities of the nodes in the active status and the priority of the specific node in the information collected by the activation information collecting unit 621.

When the status of the specific node is the standby status, the priority comparing unit 625 may compare the priorities of the nodes in the standby status and the priority of the specific node in the information collected by the standby information collecting unit.

The SA changing unit 632 may change the status of the specific node in the standby status to the active status in a specific case.

The AS changing unit 612 may change the status of the specific node in the active status to the standby status in a specific case different from the case of the SA changing unit 632.

FIG. 5 is a flowchart of a method for changing a status of cluster nodes according to an exemplary embodiment of the present invention.

Referring to FIG. 5, the method for changing a status of cluster nodes according to the exemplary embodiment of the present invention may include an initial information registering step of registering initial information by the cluster node status changing apparatus 1000 according to the exemplary embodiment of the present invention (step S100), a specific node valid status checking step of checking a valid status of a specific node (step S200), an AS changing step of determining whether to change the status of the specific node to the standby status when the specific node is in the active status (step S300), an SA changing step of determining whether to change the status of the specific node to the active status when the specific node is in the standby status (step S400), an assist flag information changing step of determining whether to change assist flag information (step S500), a priority resetting step of resetting priorities of nodes included in a cluster 1 (step S600), and a sleep step of standing by in order to perform steps S200 to S600 again after a predetermined elapses (step S700).

In detail, in the initial information registering step (step S100), a physical node may be added to the cluster 1 and metadata for the added node may be added, and a cluster node status changing apparatus 1000 according to the exemplary embodiment of the present invention may be included in the added node to be executed.

First, statuses of all nodes may become the standby status by initializing metadata of the nodes included in the cluster 1, and assist flag information of all of the nodes may be set to be Naf.

In the specific node valid status checking step (step S200), whether the specific node validly participates in the cluster 1 may be found by the valid status information receiving unit 400. Further, in step S200, when the specific node validly participates in the cluster 1, whether the specific node is in the active status or the standby status may be determined by the activation determining unit 500.

If the specific node is in the standby status, whether the status of the specific node in the standby status is to be changed to the active status may be determined by the SA change determining unit 630 (step S300).

If the specific node is in the active status, whether the status of the specific node in the active status is to be changed to the standby status may be determined by the AS change determining unit 610 (step S400).

When the specific node is the active node and the active node having the lowest priority in active nodes in the cluster 1, the assist flag information of the specific node may be changed by the assist flag information changing unit 700 (step S500).

When the specific node is the active node but not the active node having the lowest priority among the active nodes in the cluster 1, the priorities of the nodes included in the cluster 1 may be reset by the priority resetting unit 800 (step S600).

In step S300, S400, or S600, in the specific case, in the method for changing a status of cluster nodes according to the exemplary embodiment of the present invention of the specific node, the process may proceed to the sleep step (step S700). In the method for changing a status of cluster nodes according to the exemplary embodiment of the present invention, the process proceeds to the sleep step (step S700), and as a result, the node is in an operation standby status and thereafter, steps S200 to S600 may be repeatedly performed after a predetermined time elapses.

In more detail, steps S300 to S600 will be described with reference to FIGS. 6 to 9.

FIG. 6 is a flowchart illustrating one example of an SA changing step (step S300) in which an SA change determining unit 630 changes a status of a specific node which is a standby status to an active status.

In detail, a process in which the SA change determining unit 630 changes the status of the specific node in the standby status to the active status and a specific case will be described with reference to FIG. 6.

Step S300 may be applied to the case in which the specific node is in the standby status at present.

Referring to FIG. 5, the activation information collecting unit 621 may collect the information on the node in the active status among the nodes included in the cluster 1 (step S311).

The active node existence determining unit 623 may determine whether the node in the active status is present in the information collected by the activation information collecting unit 621 (step S312).

When the active node existence determining unit 623 determines that the node in the active status is present (YES), the assist flag information determining unit 624 may determine the assist flag information of the node having the lowest priority by using the information on the node in the active status, which is collected by the activation information collecting unit 621 (step S313).

If the assist flag information of the node having the lowest priority among the nodes in the active status, which is determined by determining the assist flag information is not Yaf, the process may proceed to the sleep step (step S700) (step S314).

If the active node existence determining unit 623 determines that the node in the active status is not present (NO) or if the assist flag information of the node having the lowest priority among the nodes in the active status, which is determined by determining the assist flag information is Yaf, the standby information collecting unit may collect the information on the node in the standby state among the nodes included in the cluster 1 (step S315).

The priority comparing unit 625 may compare whether the specific node has the highest priority among the nodes in the standby status collected by the standby information collecting unit (step S316).

According to a result of the comparison by the priority comparing unit 625, when the specific node has the highest priority, the SA changing unit 632 may change the standby status of the specific node to the active status (step S317) and the process may proceed to the sleep step (step S700) (step S318).

FIG. 7 is a flowchart illustrating one example of an AS changing step (step S400) in which an AS change determining unit changes a status of a specific node which is an active status to a standby status.

In detail, a process in which the AS change determining unit 610 changes the status of the specific node in the active status to the standby status and a specific case different from the case of the SA changing unit 632 will be described with reference to FIG. 7.

That is, the AS changing step (step S400) may be performed only when the specific node is in the active status at present.

The standby information collecting unit 622 may collect the information on the node in the standby status among the nodes included in the cluster 1 by using the metadata information (step S411).

The active node existence determining unit 623 may determine whether the node in the active status is present in the information collected by the activation information collecting unit 621 (step S412).

The priority comparing unit 625 may compare the priorities of the respective collected active nodes and the priority of the specific node (step S413).

According to the comparison result by the priority comparing unit 625, when the specific node has the lowest priority, the assist flag information determining unit 624 may determine the assist flag information of the specific node (step S414 and step S415).

When the assist flag information of the specific node determined by the assist flag information determining unit 624 is not Yaf, that is, when the assist flag information is Naf, the AS changing unit 612 may calculate a critical point of the specific node according to a predetermined rule and according to a calculation result, when the critical point of the specific node is equal to or less than a predetermined minimum critical point, the AS changing unit 612 may convert the active status of the specific node to the standby status (steps S419 and S420). After the AS changing unit 612 converts the active status of the specific node to the standby status, the process may proceed to the sleep step (step S700) in the present invention.

A predetermined rule may be set by using matters to be considered to determine whether to extend or reduce the node in order to provide a resource required for the cluster 1 to provide the service by a request by the user, or the like.

For example, the predetermined rule may be set to calculate the critical point of the node by considering the total number of nodes in the active status at present, load information such as a CPU usage or a memory usage of a server in each node included in the cluster 1, the number of partition requests that flow in the cluster 1, load information of the entire system, and the like.

A predetermined maximum critical point is compared with the critical point of the active node to be used to set the assist flag information to Yaf.

The predetermined minimum critical point is compared with the critical point of the active node to be used to determine whether to set the assist flag information to Naf and convert the status of the active node into the standby status.

When the node in the active status is not present or the priority of the specific node is not the lowest (step S412 and step S414), the process may proceed to the priority resetting step in the present invention. The priority resetting step will be described below with reference to FIG. 8.

When the assist flag information is Yaf or when the critical point of the specific node is more than the predetermined minimum critical point, the process may proceed to the assist flag information changing step (step S416).

FIG. 8 is a flowchart for describing one example of an assist flag information changing step (step S500).

Referring to FIG. 8, the assist mode information determining unit may determine the assist mode information of the specific node (step S511).

When the assist mode of the specific node determined by the assist mode information determining unit is Yam, the assist flag information changing unit 700 may calculate the critical point of the specific node according to a set rule (step S513) and determine whether the calculated critical point of the specific node is equal to or more than the predetermined maximum critical point (step S514).

The assist flag information changing unit 700 may change the assist flag information of the specific node to Yaf (step S515).

When the calculated critical point of the specific node is equal to or less than the predetermined minimum critical point while the calculated critical point of the specific node is equal to or less than the predetermined maximum critical point (step S516), the assist flag information changing unit 700 may change the assist flag information of the specific node to Naf (step S517). The change may include even a meaning of determining the current status as the same status as the previous assist flag information.

When the assist mode of the specific node is Naf, or when the calculated critical point of the specific node is equal to or more than the minimum critical point while being equal to or less than the maximum critical point, in the case where the assist flag information of the specific node is determined as/changed to Yaf or Naf, the process may proceed to the priority resetting step (step S600).

FIG. 9 is a block diagram illustrating one example of a priority resetting unit 800.

Referring to FIG. 9, the priority resetting unit 800 may include an active node priority resetting unit 810, a standby node priority resetting unit 820, a participation impossible node priority resetting unit 830, and an assist mode resetting unit 840.

When the specific node has the highest priority among the nodes in the active status among the nodes included in the cluster 1 while being in the active status, the priority resetting unit 800 may reset the priorities of the respective nodes included in the cluster 1.

In detail, the active node priority resetting unit 810 may reset the priority of each node in the active status, which are included in the information on the nodes in the active status to a lower priority by one step.

The standby node priority resetting unit 820 may reset the priorities of the nodes in the standby status to lower priorities by one step to be subsequent to the node in the active node having the lowest priority reset by the active node priority resetting unit 810, by using the information on the node in the standby status.

The participation impossible node priority resetting unit 830 may reset priorities of nodes which are impossible to participate in the cluster 1 to be subsequent to the lowest priority among the priorities reset by the standby node priority resetting unit 820 by using the information received by the valid status information receiving unit 400.

The assist mode resetting unit 840 may change the information of the assist modes of all of the respective nodes that are present in the cluster 1 to Nam and thereafter, change assist mode information of nodes as many as the maximum number of nodes of which the statuses may be changed to the active status sequentially from the highest priority reset by the priority resetting unit 800 in terms of the priority to Yam.

FIG. 10 is a configuration diagram of the apparatus 1000 for changing a status of cluster nodes according to an exemplary embodiment of the present invention.

The apparatus 1000 for changing a status of cluster nodes according to an exemplary embodiment of the present invention may have a configuration illustrated in FIG. 10.

The apparatus 1000 for changing a status of cluster nodes may include a processor 3 that performs a command, a storage device 4 storing data of a program for determining whether to change a status of a specific node, data of a program for resetting priorities of nodes included in a cluster 1, and the like, a memory 5, and a network interface 6 for transmitting and receiving data to and from an external apparatus.

The program stored in the storage device 4 may include a process of performing an initial information registering step (S100), a process of performing a specific node valid status checking step (S200), a process of performing an SA changing step (S300), a process of performing an AS changing step (S400), a process of performing an assist flag information changing step (S500), a process of performing a priority resetting step (S600), and a process of performing a sleep step (S700).

The program stored in the storage device 4 may perform at least one of the processes described with reference to FIGS. 1 to 9.

The respective components of FIGS. 1, 2, 3, 4, and 9 may mean software or hardware such as field-programmable gate array (FPGA) or application-specific integrated circuit (ASIC). However, the components are not meant to be limited to the software or hardware and may be configured to be positioned in a storage medium which is addressable or execute one or more processors. A function provided in the components may be implemented by more segmented components or one component that performs a specific function by integrating a plurality of components.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A cluster node status changing apparatus for changing operation states of nodes included in a cluster in a multi-node environment in which the nodes have priorities, the apparatus comprising:
a valid state information receiving unit, implemented via a CPU, configured to receive information regarding whether a specific node among the nodes is unable to participate in the cluster;
an activation determining unit, implemented via a CPU, configured to determine whether the specific node is in an active state or in a standby state, in case that the information indicates that the specific node is able to participate in the cluster; and
a state change determining unit, implemented via a CPU, configured to determine whether to change a state of the specific node determined by the activation determining unit by using the priorities of the nodes in case that the information indicates that the specific node is able to participate in the cluster,
wherein in the standby state, the node stands by from participating in the cluster when the information received by the valid state information receiving unit indicates that the specific node is able to participate in the cluster, and
wherein the state change determining unit comprises:
an activation information collecting unit configured to collect information on a node in the active state among the nodes in the cluster by using metadata information of the nodes, when the node in the active state is present among the nodes included in the cluster: and
a standby information collecting unit configured to collect information on a node in the standby state among the nodes included in the cluster by using metadata information of the nodes, when the node in the standby state is present among the nodes included in the cluster,
wherein the information on the node in the active state, which is collected by the activation information collecting unit, comprises priority information and assist flag information of the node in the active state, and
wherein the information on the node on the standby state, which is collected by the standby information collecting unit, comprises priority information of the node in the standby state.

2. The cluster node status changing apparatus of claim 1, wherein the state change determining unit comprises
a first change determining unit configured to determine whether to change the state of the specific node in the standby state to the active state.

3. The cluster node status changing apparatus of claim 2, wherein when the node in the active state is not present among the nodes included in the cluster, the first change determining unit compares in a comparison, the priorities of collected nodes in the standby state and a priority of the specific node, by using the collected information on the node in the standby state, and changes the state of the specific node to the active state when the priority of the specific node is highest among the nodes included in the cluster according to a result of the comparison.

4. The cluster node status changing apparatus of claim 3, wherein the first change determining unit comprises:
an assist flag information determining unit configured to determine assist flag information of a node (Node A) having the lowest priority among the collected nodes in the active state when one or more nodes in the active state are present among the nodes included in the cluster;
a first priority comparing unit configured to compare the priorities of the collected nodes in the standby state and the priority of the specific node by using the collected information on the collected nodes in the standby state when the assist flag information determined by the assist flag information determining unit indicates that that a node having a lower priority than the Node A by one step is changeable to the active state; and
a first changing unit configured to change the state of the specific node to the active state when the priority of the specific node is the highest priority among the collected nodes according to a result of the comparison by the first priority comparing unit.

5. The cluster node status changing apparatus of claim 4, wherein:
when the assist flag information determined by the assist flag information determining unit indicates that that the node having the lower priority than the Node A by one step is not changeable to the active state, or when the priority of the specific node does not have the highest priority among the collected nodes according to the comparison result by the first priority comparing unit, the valid state information receiving unit receives the information, the activation determining unit determines whether the specific node is in an active state or in a standby state, and the state change determining unit determines whether to change the state of the specific node again after a predetermined time elapses without changing the state of the specific node to the active state.

6. The cluster node status changing apparatus of claim 1, wherein the cluster node status changing apparatus receives initial priority setting information which sets information of the specific node, and information on a maximum number of nodes of which states are changeable to the active state, which is a state in which a node participates in the cluster,
the cluster node status changing apparatus further comprises:
an assist flag information providing unit configured to provide assist flag information, which is information regarding whether the standby state of a node corresponding to a lower priority than a priority of the specific node by one step is changeable or unchangeable to the active state when the node corresponding to a lower priority than the priority of the specific node by one step is in the standby status, and
an assist mode information providing unit configured to provide assist mode information, which is information regarding whether to change the information provided by the assist flag information providing unit by using the information on the maximum number of nodes of which states are changeable to the active state, which is received by an initial information receiving unit, wherein the state change determining unit is further configured to determine whether to change the state of the specific node determined by the activation determining unit by using the assist mode information and the assist flag information.

7. The cluster node status changing apparatus of claim 1, wherein the state change determining unit further comprises
a second change determining unit configured to determine whether to change the state of the specific node in the active state to the standby state.

8. The cluster node status changing apparatus of claim 7, wherein the second change determining unit comprises:
a second priority comparing unit configured to compare the priorities of the collected nodes in the active state and the priority of the specific node, by using the collected information on the node in the active state, when one or more nodes in the active state are among the nodes included in the cluster;
an assist flag information determining unit configured to determine the assist flag information of the specific node when the priority of the specific node is the lowest priority among the collected nodes in the active state according to the comparison result by the second priority comparing unit; and
a second changing unit configured to change the state of the specific node to the standby state when the determined assist flag information of the specific node indicates that the node having the lower priority than the specific node by one step is not changeable to the active state, and when a critical point pertaining to the specific node, which is calculated according to a predetermined rule, is equal to or less than a predetermined minimum critical point.

9. The cluster node status changing apparatus of claim 7, wherein:
when the node in the active state is not present among the nodes in the active state included in the cluster according to the information collected by the activation information collecting unit, or when the priority of the specific node is the highest among the collected nodes in the active state according to the comparison result by the second priority comparing unit,
a priority resetting unit is configured to reset priorities of all nodes included in the cluster.

10. The cluster node status changing apparatus of claim 9, wherein
the priority resetting unit comprises:
a first node priority resetting unit configured to reset the priorities of the nodes in the active state, which are indicated in information on the nodes in the active state, such that the priorities thereof are lowered by one step;
a second node priority resetting unit configured to reset the priorities of the nodes in the standby state to lower priorities by one step such that priorities are subsequent to the priority of the node in the active state having the lowest priority among the nodes in the active state which had priorities reset by the first node priority resetting unit, by using the information on the node in the standby state; and
a third node priority resetting unit configured to reset priorities of nodes which are unable to participate in the cluster such that priorities are subsequent to the node or nodes having the lowest priority among the nodes in the standby state which had priorities reset by the second node priority resetting unit, by using the information received by the valid state information receiving unit.

11. The cluster node status changing apparatus of claim 10, wherein the priority resetting unit further comprises an assist mode resetting unit configured to change the assist mode information of as many of the nodes as is possible up to the maximum number of nodes of which the states are changeable to the active state, sequentially from the highest priority among the priorities reset by the priority resetting unit, to information indicating that the information provided by the assist flag information providing unit is changeable after changing the information of the assist modes of all of the nodes which are present in the cluster to the information indicating that it is impossible to change the information provided by the assist flag information providing unit.

12. The cluster node status changing apparatus of claim 1, wherein the activation determining unit is further configured to determine whether the specific node is in the active state in which the specific node participates in the cluster or the standby state by using metadata of the specific node.

13. The cluster node status changing apparatus of claim 1, wherein one cluster node status changing apparatus is mapped to one of the nodes included in the cluster, and one cluster node status changing apparatus diagnoses and changes a state of one mapped node.

14. A non-transitory computer readable recording medium having a program recorded therein, the program performing the steps of:
receiving information regarding whether a specific node among nodes included in a cluster under a multi-node environment in which nodes have priorities is unable to participate in the cluster;
determining whether the specific node is in an active state or in a standby state in which the specific node stands by from participating in the cluster when the information received by the valid state information receiving process indicates that the specific node is able to participate in the cluster, in case that the information indicates that the specific node is able to participate in the cluster; and
determining whether to change the state of the specific node, which is determined by an activation determining unit by using the priorities of the nodes, in case that the valid state information indicates that the specific node is able to participate in the cluster,
wherein the determining of whether to change the status comprises:
collecting information on a node in the active state among the nodes included in the cluster by using metadata information of the nodes; and
collecting information on a node in the standby state among the nodes included in the cluster by using metadata information of the nodes,
wherein the information on the node in the active state comprises priority information and assist flag information of the node in the active state, and
wherein the information on the node in the standby state comprises priority information of the node in the standby state.

15. A method for changing a state of cluster nodes, which changes operation states of nodes included in a cluster under a multi-node environment in which nodes have priorities, the method comprising:
receiving information regarding whether a specific node among the nodes is unable to participate in the cluster;

determining whether the specific node is in an active state or in a standby state in which the specific node stands by from participating in the cluster when the information received by a valid state information receiving process indicates that the specific node is able to participate in the cluster, in case that the information indicates that the specific node is able to participate in the cluster; and determining whether to change the state of the specific node determined by an activation determining unit by using priorities of the respective nodes, in case that the information indicates that the specific node is able to participate in the cluster, wherein the determining of whether to change the status comprises:

collecting information on a node in the active state among the nodes included in the cluster by using metadata information of the nodes; and collecting information on a node in the standby state among the nodes included in the cluster by using metadata information of the nodes, wherein the information on the node in the active state comprises priority information and assist flag information of the node in the active state, and wherein the information on the node in the standby state comprises priority information of the node in the standby state.

16. The method of claim 15, wherein the determining of whether to change the status comprises
determining whether to change the state of the specific node in the standby state to the active state.

17. The method of claim 16, wherein the determining whether to change the state of the specific node in the standby state to the active state comprises:
comparing the collected priorities of the nodes in the standby state and the priority of the specific node, by using the collected information on the node in the standby state when the node in the active state is not present among the nodes included in the cluster; and
changing the state of the specific node to the active state when the priority of the specific node is highest according to a result of a comparison of the collected priorities.

18. The method of claim 15, wherein the determining of whether to change the state comprises
determining whether to change the state of the specific node in the active state to the standby state.

* * * * *